(12) United States Patent
Solie et al.

(10) Patent No.: US 8,094,008 B2
(45) Date of Patent: Jan. 10, 2012

(54) CODED ACOUSTIC WAVE SENSORS AND SYSTEM USING TIME DIVERSITY

(75) Inventors: Leland P. Solie, Chetek, WI (US); Jacqueline H. Hines, Annapolis, MD (US)

(73) Assignee: Applied Sensor Research & Development Corporation, Arnold, MD (US)

( * ) Notice: Subject to any disclaimer, the term of this patent is extended or adjusted under 35 U.S.C. 154(b) by 537 days.

(21) Appl. No.: 12/267,153

(22) Filed: Nov. 7, 2008

(65) Prior Publication Data
US 2009/0121847 A1    May 14, 2009

Related U.S. Application Data

(60) Provisional application No. 60/986,721, filed on Nov. 9, 2007.

(51) Int. Cl.
*G08B 21/00* (2006.01)
(52) U.S. Cl. ............... 340/539.1; 340/572.1; 310/313 D
(58) Field of Classification Search ............... 340/539.1, 340/539.22, 539.26, 572.1; 310/311–313 D
See application file for complete search history.

(56) References Cited

U.S. PATENT DOCUMENTS

| 7,100,451 | B2 * | 9/2006 | Solie ............................... 73/703 |
| 7,268,662 | B2 * | 9/2007 | Hines et al. ....................... 338/34 |

* cited by examiner

*Primary Examiner* — Jeffery Hofsass
(74) *Attorney, Agent, or Firm* — Schiff Hardin LLP

(57) ABSTRACT

An apparatus and method for distinguishing between sensors that are to be wirelessly detected is provided. An interrogator device uses different, distinct time delays in the sensing signals when interrogating the sensors. The sensors are provided with different distinct pedestal delays. Sensors that have the same pedestal delay as the delay selected by the interrogator are detected by the interrogator whereas other sensors with different pedestal delays are not sensed. Multiple sensors with a given pedestal delay are provided with different codes so as to be distinguished from one another by the interrogator. The interrogator uses a signal that is transmitted to the sensor and returned by the sensor for combination and integration with the reference signal that has been processed by a function. The sensor may be a surface acoustic wave device having a differential impulse response with a power spectral density consisting of lobes. The power spectral density of the differential response is used to determine the value of the sensed parameter or parameters.

14 Claims, 8 Drawing Sheets

US 8,094,008 B2

CODED ACOUSTIC WAVE SENSORS AND SYSTEM USING TIME DIVERSITY

CROSS-REFERENCE TO RELATED APPLICATION

This application claims the benefit of U.S. Provisional Patent Application Ser. No. 60/986,721, filed Nov. 9, 2007, which is incorporated herein by reference.

STATEMENT REGARDING FEDERALLY SPONSORED RESEARCH OR DEVELOPMENT

This invention was made with Government support under Contract NNK07EA38C awarded by NASA. The Government has certain rights in this invention.

BACKGROUND OF THE INVENTION

1. Field of the Invention

The present invention relates generally to a surface acoustic wave sensor and an interrogator apparatus for wireless communication with the surface acoustic wave sensor and to a method for distinguishing between multiple sensors.

2. Description of the Related Art

The simultaneous interrogation of uniquely identifiable wireless sensors is recognized as a highly desirable goal. To facilitate achieving this goal, active sensor nodes and passive-acting sensor nodes containing active components often contain memory that stores a code to identify each sensor. The interrogating system can interact with these sensors using a "handshake" process that instructs the sensor when to take a measurement and return its information. Thus, sensors can be instructed to delay their return signal by a specified delay in order to reduce collisions between signals from multiple sensors, or they can be instructed to re-send the measurement, among other options. This level of bi-directional interaction, with the sensor modifying its response to interrogation based on specific instructions, is only possible in systems where the sensors contain active components. In a wireless sensor system utilizing purely passive sensors such as acoustic wave (or surface acoustic wave—SAW) sensors, the sensor acts as a passive reflector for the radio frequency (RF) interrogation signal. When a broadcast interrogation signal is being used (as compared to broadcasting a coded signal specific to one of the sensors), all of the SAW sensors within the range of a particular interrogator will reflect back sensor responses, each containing information on the sensor identification and the measured (or sensed) parameter. Since there is no way to select a single sensor in such a broadcast system, these response signals will arrive at the receiver at slightly varying times based on their physical locations due to the small RF signal propagation delay. In order to resolve the individual sensor signal responses, it is necessary to achieve discrimination between sensor responses, which has historically been achieved for SAW sensors using sensor coding.

Well known wireless coded SAW sensors include single frequency "tag" sensors such as the multiple tap reflective delay line temperature sensor shown in 1981 by Vaughan (U.S. Pat. No. 4,399,441), and the orthogonal frequency coded (OFC) SAW sensor developed recently by Malocha. Other RFID tags using SAW also use such encoding techniques, including various coding approaches (on-off keying, phase coding, etc.). These devices incorporate a code in the reflector structures on the SAW surface to produce reflections that occur at specific times. In the traditional single frequency reflective tag approach, there is generally a "start" reflector and a "stop" reflector to indicate when the interrogator can start to read the response, and when the response is complete. Between these two reflectors are multiple reflectors that are either present or absent (or in other variations the positions are modified to alter the phase of the reflection) to create a code, along with error checking bits. The start bit in this case effectively "turns on" the signal processing in the interrogator to initiate code identification. Such single frequency tags have been used successfully in applications that can utilize scanning of a single tag at a time, at relatively short range, such as monitoring identification of livestock or automobile toll booths. Such approaches are not well suited to use in a system where multiple sensors would respond to interrogation in a given time window, as the signals cannot be adequately resolved from one another.

OFC (orthogonal frequency coded) sensors attempted to address this issue by providing codes within the sensors that are inherently orthogonal. The mathematical relationship between codes used in a sensor system is such that each code will correlate well with itself, producing a clear correlation peak (or in the case of differential delay line sensors, producing a pair of correlation peaks), while interacting with different codes to produce cross correlations that are much lower and without clear peaks. In theory this should allow for clear sensor discrimination. However, in practice this approach encounters significant problems. Specifically, the orthogonality of the codes is only maintained if they are operating in a synchronous system. Because of the random RF propagation delays experienced by signals from each sensor, and due to changes in delay due to the sensed parameter, even ideal orthogonal codes will necessarily produce non-orthogonal interfering signals. This issue, which has been widely recognized in the realm of CDMA (code division multiple access) communication systems, makes the use of orthogonal codes alone as a basis for passive sensor discrimination ineffective.

It is well known in the wireless communication industry that there are several possible approaches to achieve multi-user access to shared bandwidth. The ability of each approach to provide robust, reliable demodulation of multiple randomly occurring signals without interchannel interference is a measure of the efficacy of the approach. Well known approaches include Code Division Multiple Access (CDMA), Time Division Multiple Access (TDMA), and Frequency Division Multiple Access (FDMA). CDMA systems assign different codes (or signature waveforms) to each user, and the interrogation system is responsible for identifying the sensor from the collective responses received. TDMA systems utilize signature waveforms that do not overlap in the time domain—one user utilizes the channel, then another, and so forth. FDMA systems separate users in the frequency domain by allocating specific bandwidth to each user, so that signature waveforms do not overlap in the frequency domain. Strictly speaking, TDMA and FDMA systems do not need to utilize coded waveforms unless the resource (time or frequency slot) allocation is dynamic, although the inclusion of such codes increases system capacity.

When reviewing wireless SAW sensor systems developed to date, it is clear that in those systems where multiple simultaneous sensor interrogation has been attempted, one of these standard approaches to multiple access has been utilized. For example, OFC sensors used a CDMA approach, while SAW resonator sensor systems with frequency diversity utilize FDMA. Not considered here are sensor systems that broadcast coded signals to interrogate a specific sensor, but rather systems that interrogate a group of sensors simultaneously and interpret the resulting sensor responses. It is clear that these techniques can be used to advantage when combined in ways that have not previously been demonstrated.

These earlier devices relate to the combination of CDMA and TDMA techniques in SAW sensor devices and systems, and the advantages obtained therefrom. In all prior coded SAW sensors, there has generally been a "pedestal" delay, or a nominal delay due to SAW propagation from the launching transducer to the first reflective tap and back, or to the first output transducer, etc. The measurements made by these sensors utilized the differential delays between this initial delayed response and subsequent responses—either in differential delay line sensors, or tag responses where all subsequent responses are referenced to the "start" bit. The pedestal delay is chosen to be any convenient delay, and this acoustic delay, augmented by the RF propagation delay, has been a noncritical value in sensor and system design. In fact, the slow acoustic propagation delay for this first response signal has been recognized as one of the major benefits of using acoustic wave sensor devices—i.e. RF multipath reflections will have time to decay away before the first acoustic response returns. But other than its utility for avoiding multipath, this nominal pedestal delay has been treated by prior sensor developers as non-critical.

U.S. Pat. Nos. 7,100,451, 7,268,662 B2, and 7,434,99 B2 have taught that two time integrating correlator channels can operate on adjacent frequency bands and determine the relative amounts of returned radio frequency (RF) energy in each frequency band. This ratio, in turn, can be used as a measurand to indicate some property to be sensed, e.g., temperature, pressure, chemical concentration, etc.

SUMMARY OF THE INVENTION

The present invention provides an apparatus for interrogating sensors and also provides the sensors themselves. The present invention also provides a method for interrogating sensors. The apparatus and method permits multiple sensors to be distinguished from one another using a combination of code diversity and time diversity wherein the time diversity is obtained by different pedestal delays in the surface acoustic wave sensors.

The present invention makes use of the pedestal delay as an added factor to provide discrimination between sensors. In a CDMA sensor system using a finite set of unique codes with desirable auto and cross correlation properties, with all of the sensors responding within a specific time interval, we can assume there are M "good" codes. These M codes are codes that work well together and can be discriminated from one another based on signal processing and extraction from the combined RF response signal. Since the time duration of these responses (or codes) is finite, it is possible to produce multiple SAW sensors utilizing the same code, each with discrete, different pedestal delays—essentially time division multiplexing on the SAW device—to allow re-use of the codes in different time slots, thereby increasing the possible number of sensors that can be achieved in a given system. This general enhancement can be used independent of the coding technique used and the specific device structure. For example, reflective multi-tap delay line sensors and OFC-like sensors (with orthogonal or non-orthogonal codes) can both be produced with multiple nominal pedestal delays. All known methods of coding could be used in these devices. If there were N possible distinct time slots that provided adequate separation in time between sensor responses (taking into account the signal delay variations that would result from RF propagation delay and changes in sensor signal delay due to the sensed parameter), then a set of M codes could be used to produce M*N sensor responses that could be differentiated in a practical system.

In addition to time diversity using variations in the pedestal acoustic delay of coded SAW sensors, another embodiment of the present invention utilizes discrete variations in the differential delay (either alone or in combination with variations in the pedestal delay) to further enhance the number of sensors capable of operating simultaneously in a system. In systems where differential delay is utilized as a measurand, such as the correlative OFC-like sensor system, the difference between the timing of two (or more) responses is used as a measure of the sensed parameter. Such sensors can be designed to "re-use" codes with substantially different differential delays, provided the delay separation is sufficient to avoid overlap between responses over the relevant operating range of the devices. Similarly, varying differential delays in the power spectral density approach described below could allow re-use of codes, further enhancing sensor diversity (albeit at the expense of substantially increased interrogator system complexity). These TDMA-CDMA combined approaches can be used in systems that integrate at one point in time (as in the embodiment discussed below) and in those that use more conventional averaging and/or integration of sensor signal responses collected or sampled over a range of time. Both digital and analog variations of averaging and/or integration are within the scope of the inventions.

The design of an interrogation system for time diverse coded SAW sensors will be similar to that for the non-time-diverse sensor case, but with added requirements of delay discrimination between response signals. Thus, the interrogator would need to "look" at the sensor responses received within predefined time windows and determine sensor identifications and measured responses for each window. The present inventions not only allow for combined CDMA/TDMA systems with discrete (i.e. non-overlapping in time) coded waveforms, but also envisions interrogation system embodiments that would allow for code waveforms to overlap in time—i.e. the TDMA time slots may be shorter than the code length in time. Such systems will allow the re-use of codes with less separation in time than would be required for traditional TDMA systems. One novel interrogation system implementation that would be advantageous for use with time diverse SAW sensors operates based on power spectral density variation. This preferred system embodiment is described below and in the accompanying figures.

BRIEF DESCRIPTION OF THE DRAWINGS

FIG. 2b is a graph of the time domain impulse response of the device of FIG. 2a;

FIG. 2c is a graph showing the frequency domain response of the device of FIG. 2a;

DETAILED DESCRIPTION OF THE PREFERRED EMBODIMENTS

The invention provides an interrogation system for passive SAW sensors with time diversity.

Figure 1:
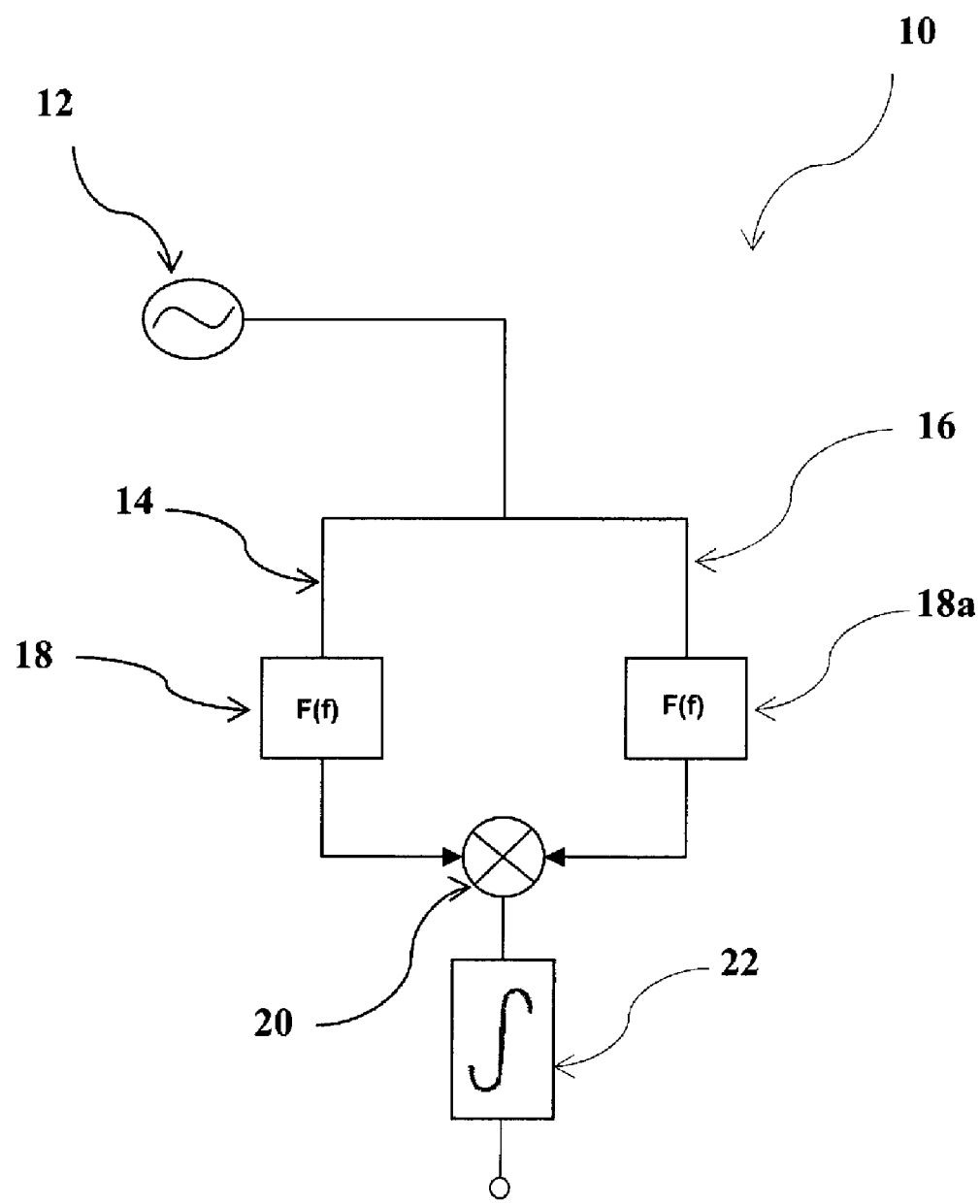
FIG. 1 is a functional block diagram of a time integrating correlator circuit that serves as a basis for an interrogator according to the present invention.

The time integrating correlator has been in use in signal processing applications for many years. In its simplest form, as shown in FIG. 1, the correlator 10 includes a signal source 12 which is split into two paths, a reference path 14 and a signal path 16. A transfer function 18 for each of the two paths can be defined as F(f), where F(f) is an arbitrary function but is common to both paths except for a possible multiplicative scalar factor "a" in one of the paths. The signal following the transfer function F(f) 18 in the reference path 14 is multiplied, such as in a multiplier 20, by the signal following the transfer function F(f) 18a in the signal path 16 and the product is applied to an integrator 22. Since the product is the square of the transfer function F(f) (a positive quantity), the integral at the output of the integrator 22 is a monotonically increasing function. Even if the signal source 12 is a white noise function, the square of the noise function is always a positive valued function and so the integral is a monotonically increasing function.

In order for the product to be the square of the input signal and hence a positively valued function, the time delay of the reference path 14 must be identical to the delay in the signal path 16 or else the product signal will not be the square of the signal source 12 and hence always a positive valued function. In other words, if a time delay in one signal path differs from the delay of the other path, the signal input to the integrator 22 may include negative values. If the two paths 14 and 16 are in fact identical except for a possible scalar factor (including having the same time delay) then the time integrating correlator 10 will simply demonstrate the existence of the signal path 16. If the signal path 16 is a radar signal that has been transmitted, reflected off a target, and returned to the radar source, then the output from the integrator 22 simply confirms that a radar target has been found, and from a determination of the time delay that results from the transmittal and reflection of the signal, the distance to and from the radar target can be determined.

Figure 2A:
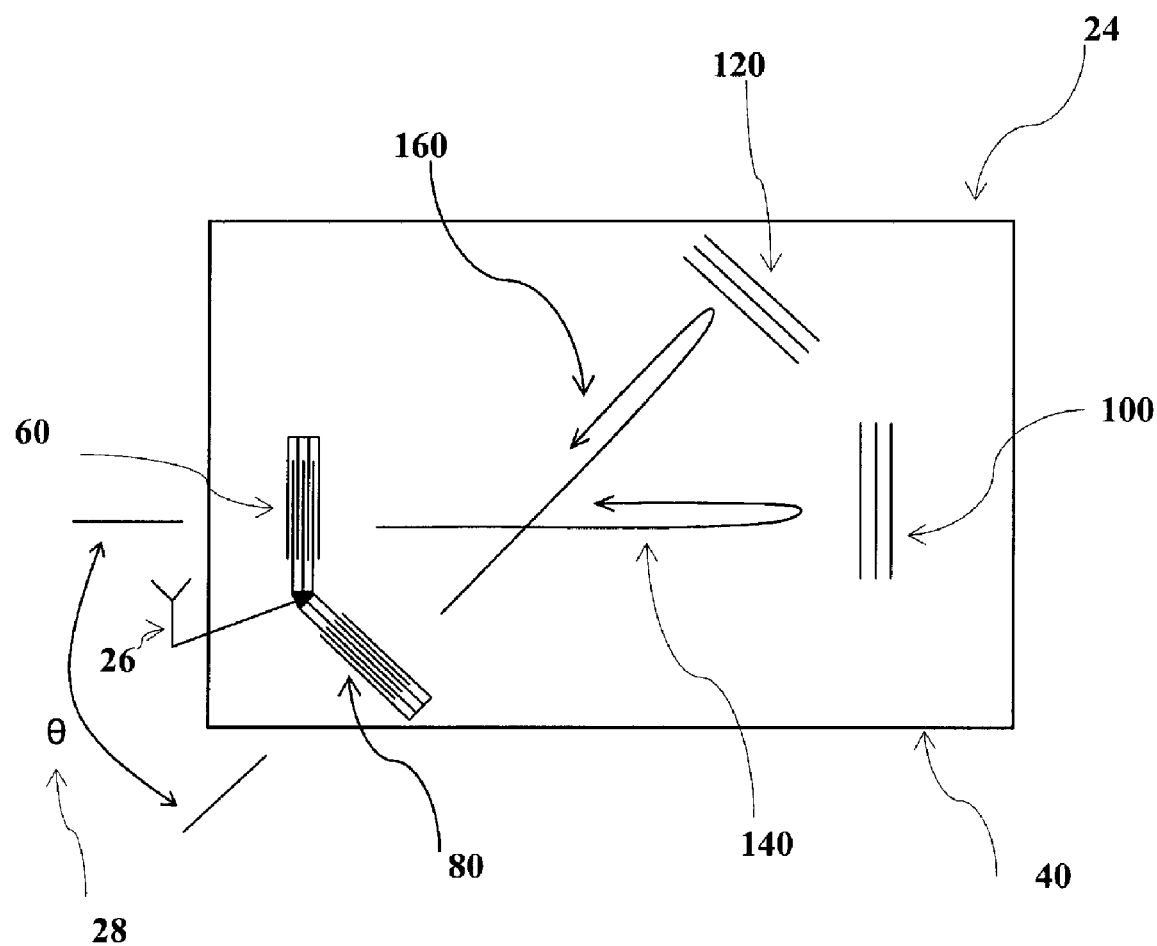
FIG. 2a is a schematic plan view of a piezoelectric substrate having two surface acoustic wave device paths thereon that serves as an example of a sensor.

In order to understand how two time integrating correlator channels can operate on adjacent frequency bands and determine the relative amounts of returned radio frequency (RF) energy in each frequency band and how this ratio, in turn, can be used as a measurand to indicate some property to be sensed, such as temperature or pressure, as an example look to sensor 24 as shown in FIG. 2a. There are several different embodiments of the sensor possible within the scope of the present invention and of course these vary with the item to be sensed, but the operation of all these sensors involves perturbing the energy distribution across the frequency spectrum. It is this perturbation in the frequency power spectrum which is used to indicate the quantity being measured.

Figure 3:
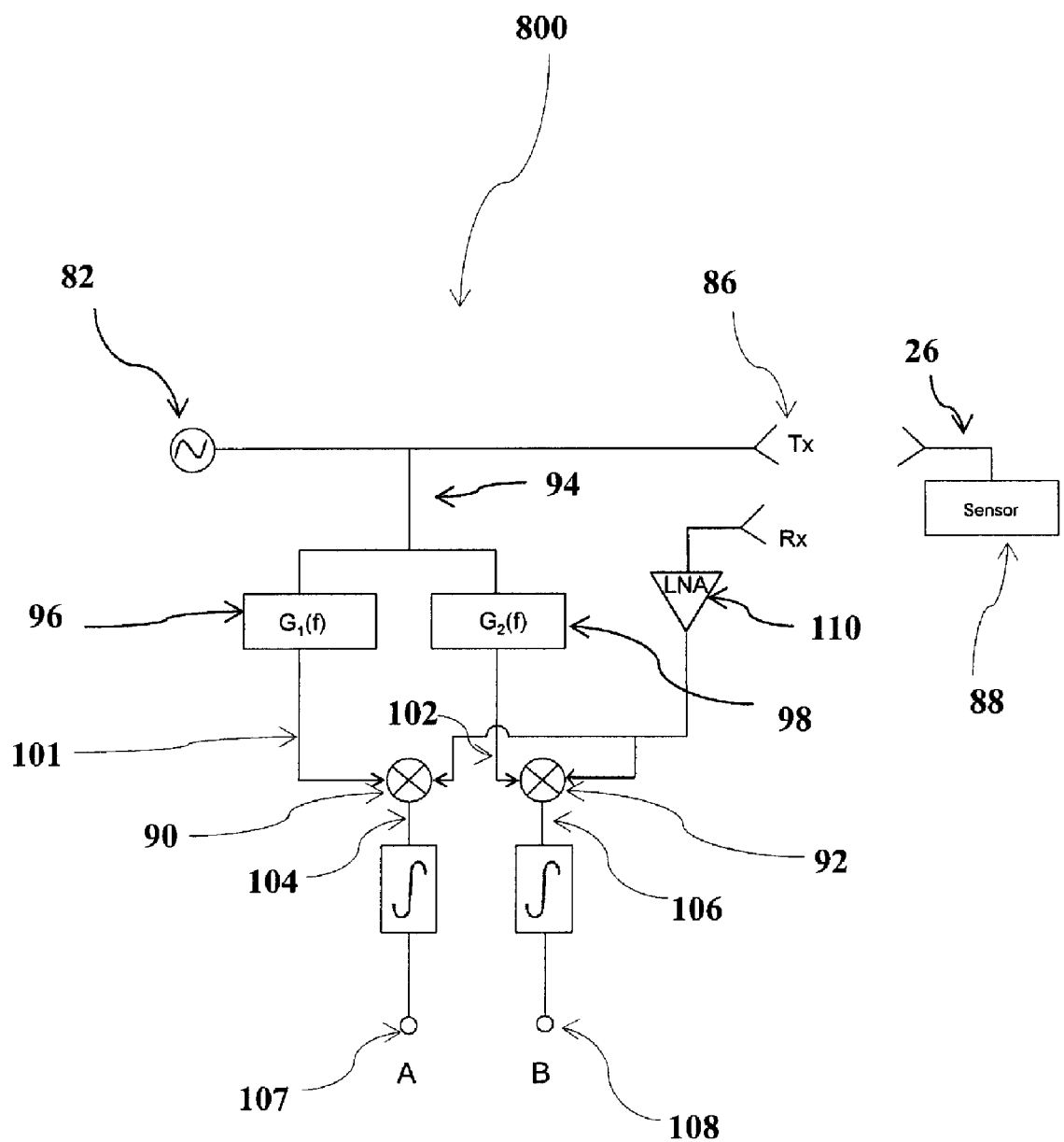
FIG. 3 is a block circuit diagram of a power spectral density system showing an interrogator and a sensor according to the present invention.

A signal is transmitted by an interrogator (such as shown in FIG. 3), is picked up by an antenna 26 of the sensor 24, and applied to a pair of transducers 60 and 80 on a substrate 40. The transducers 60 and 80 are mounted at an angle θ, reference number 28, to one another to direct the received signal along two different tracks 140 and 160. In each track 140 and 160 a surface acoustic wave (SAW) is launched by the respective transducer 60 and 80, propagates toward a reflector 100 and 120, respectively, which reflects the SAW back toward the transducer 60 or 80. The transducers 60 and 80 detect the SAWs, converting the acoustic waves to a summed RF signal, which the antenna 26 transmits back to the interrogator.

Figure 2B:
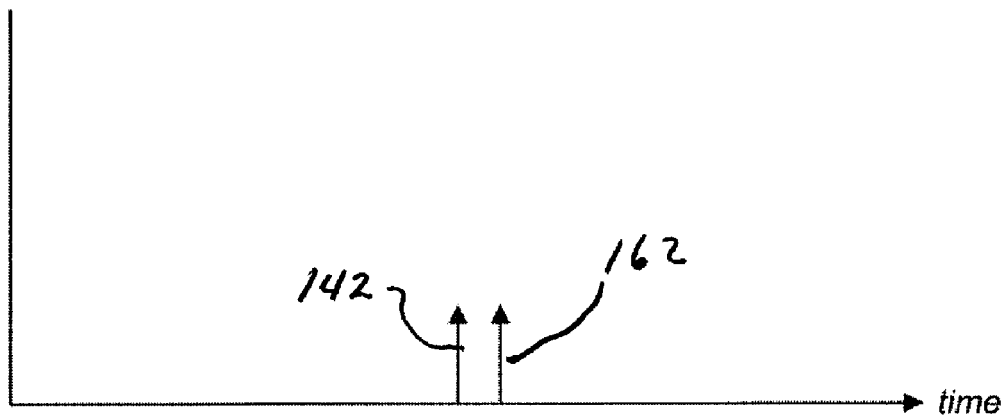
Figure 2C:
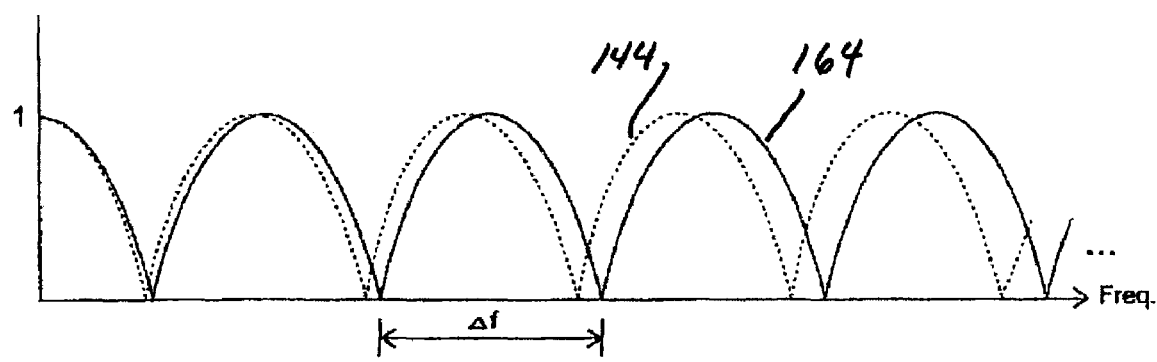

The two tracks 140 and 160 in the sensor 24 are differential tracks, and differ in nominal delay by an amount that is typically less than hundreds of nanoseconds. The SAW velocity in the two tracks 140 and 160 have a different response to the item to be sensed, e.g., the two tracks may have different temperature coefficients of delay so that as the temperature to which the sensor 24 is exposed changes the relative delays in the two tracks 140 and 160 change. Or one track may have a deposited film on the substrate 40 which absorbs or otherwise holds certain chemicals or other agents. The absorption or other change in turn perturbs the SAW velocity, changing the relative delay in the two tracks. In FIG. 2b, the idealized impulse response consisting of the signals 142 and 162 are shown on a time line. When the two SAW signals are combined they comprise a two-tap transversal filter with a set of lobes in the frequency domain as shown in FIG. 2c. The width of these lobes in frequency Δf is determined by the separation of the two pulses 142 and 162 in time. As illustrated by the broken line curve 144 compared to the solid line curve 164 of FIG. 2c these lobes can move very significantly for small changes in delay, enhancing the sensitivity of the system over an approach which simply measures changes in SAW delay in the time domain.

An interrogator 800 which is capable of detecting changes in the power spectral density is shown in FIG. 3. The source 82 is a wide band noise or pseudo noise source. The source signal is transmitted to the sensor 88 by an antenna 86, is reflected back to the interrogator 800 where it is received by an antenna and passes through a low noise amplifier (LNA) 110 and is applied to one of the inputs of two identical multipliers 90 and 92. This path is the interrogation path. The source signal is also applied through reference path 94 to two filters $G_1(f)$ 96 and $G_2(f)$ 98. These are two adjacent passband responses that direct the lower half of the passband through the filter $G_1(f)$ 96 and the upper half of the passband through the filter $G_2(f)$ 98. These paths 101 and 102 are the reference paths for each track. In addition the sum of the two passband functions 96 and 98 provide exactly the same S21 response (including time delay) as is experienced in the sensor 88.

The full frequency response (spanning the bandwidth of both filters $G_1(f)$ 96 and $G_2(f)$ 98) passes through the sensor 88 where it is multiplied by the "lobed" response of the sensor as shown in FIG. 2c. This "lobed" response is applied to each of the multipliers 90 and 92. The lower portion of the total passband from the reference source signal passes through the filter $G_1(f)$ 96 and in multipler 90 is multiplied by the full bandwidth, i.e., lower portion and upper portion from the sensor, to form at 104 the square of the signal contained in the lower portion of the total passband, which is integrated to a monotonically increasing signal 107 at output A. The upper portion of the passband from the sensing path also is multiplied by the lower portion of the passband from the filter $G_1(f)$, but these two signals are uncorrelated to each other and so the product is randomly positive and negative and so integrates out to zero. So the output 107 at A is the integral of the power in the lower portion of the sensor frequency response as modulated by the "lobes" in the sensor response.

Likewise the output 108 at B is the integral of the power in the upper portion of the sensor frequency response as modulated by the "lobes" in the sensor response following integration of the signal 106. The ratio between output 107 at A and output 108 at B is a measure of how much the "lobes" have shifted due to changes in the quantity to be measured.

So far it has been assumed that the delay in the reference path (path 14 of FIG. 1) can be made identical to the delay in the signal path (path 16) so that when they are multiplied by one another the result is truly the square of the source response (and integrates to a nonzero level). If the delays are not equal, the two signals multiplied together will be randomly positive and negative and will not contribute toward a nonzero integral at the outputs A or B. In a practical sensor system the signal path represents the interrogation path for each sensor. In general the two delay paths will not be equal or if they are they will not stay equal with any change in the sensor path. There must be a means of dynamically controlling the delay in the reference path to keep it equal to the interrogation path delay, or a means of dynamically controlling the delay in the interrogation path to keep it equal to the reference path delay.

Figure 4:
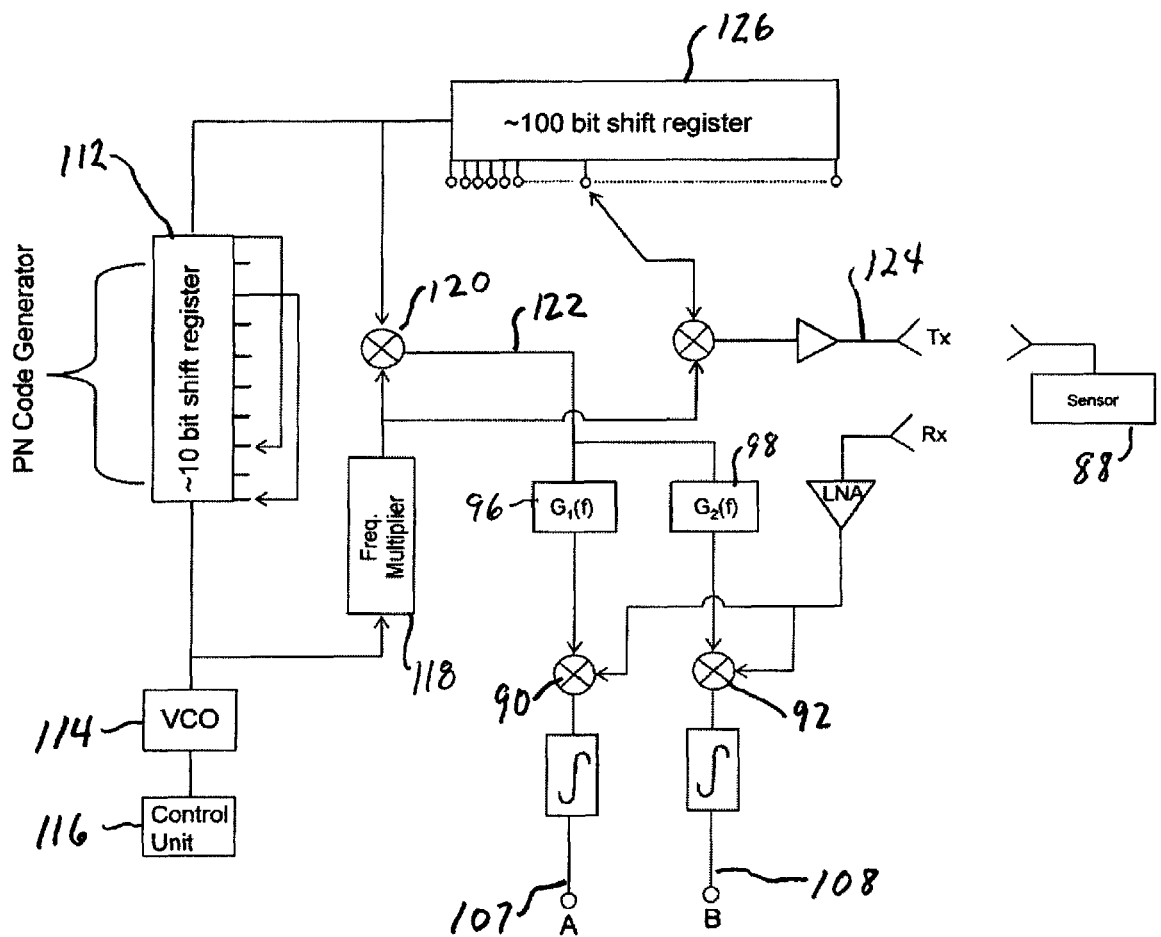
FIG. 4 is block circuit diagram showing a circuit implementing time diversity discrimination in an interrogator for a power spectral density sensor system according to the present invention.

One way in which this can be done is shown in FIG. 4. The source is provided as a pseudo noise (PN) generator 112 which is driven by a system clock formed by a voltage controlled oscillator 114 controlled by a control unit 116. The oscillator 114 also feeds a frequency multiplier 118, the output of which is multiplied in multplier 120 by the output of the pseudo noise generator 112 to provide a signal for the reference path 122. The PN code has a repeat length TAU. The reference path 122 is made to differ from the signal path 124 by one (or more) units of TAU. In this way the reference signal repeats every multiple of TAU so a difference of TAU does not affect the product from the multipliers 90 and 92. However, if the clock frequency is changed, the time TAU also changes (stretches or shrinks) so that by varying the clock frequency one can make the effective time delays in the reference and signal paths 122 and 124 equal. If one takes the sum of the absolute values of the outputs 107 and 108 at A and B equal to C, one can use a feedback circuit to vary C to maximize the value of C. This condition will only be met if the delay paths of the reference and signal paths are equal. Only by making the signal and reference delay paths 122 and 124 equal can one address the sensor 88. If the delay paths are not equal, the sensor 88 will not be detected by the interrogator. This opens up the possibility of having several sensors within the range of a single interrogator and individually addressing each sensor, i.e., having an ID (identity) for each sensor that allows it to be individually tracked. Thus, according to the present invention, individual detection of multiple sensors is provided for by a single interrogator.

The present invention provides a method and apparatus for individually addressing a number of sensors which are all located within the range of the interrogator. A preferred way of accomplishing this goal is by introducing extra delays in the reference path and corresponding extra delays in each sensor so that the total delay in the reference path will match the delay in only one sensor at a time. The most straightforward manner to introduce this delay into the reference path is by adding delays in the filters $G_1(f)$ and $G_2(f)$. In this approach the delay is implemented by using SAW devices in the interrogator, where an arbitrary amount of delay can be added in the reference path by increasing (or decreasing) the physical distance between the input and output transducers of these filters. Likewise in the sensors the nominal spacing between the transducers and the reflectors is varied so as to introduce discrete steps of delay which are matched by the same discrete delay steps in the reference path making them matched pairs of devices. In operation, a set of filters $G_1(f)$ and $G_2(f)$ are mechanically or electronically inserted into the reference path in the interrogator, and then the search for the corresponding sensor is made. This approach does not allow for dynamically varying the delays.

A preferred embodiment of this invention takes advantage of how the PN code can be generated. A common technique for generating a PN code is shown in the interrogator of FIG. 4. In this technique a shift register 112 is driven by a system clock 114 and a set of feedback connections are made along the path of the shift register 112 as shown for example in FIG. 4. Each set of feedback connections generate a unique PN code and if there are N shift registers in the path involving the feedback connections the code has a repeat length of $2^N-1$. For example if the shift register with feedback connections contains only 10 shift registers the length of the PN code is 255 bits. Alternative embodiments have added to the arrangement of FIG. 4 additional shift registers following the PN code generating region, but in this region there will be no feedback connections and the code can be tapped after any of the shift registers. There is a master clock referred to in FIG. 4 as a VCO (voltage controlled oscillator) 114. This is because the clock can be controlled by the control unit 116 so that its frequency can be changed to adjust the effective delay of the reference path by varying the time TAU of the PN code as mentioned earlier. The output of the VCO 114 is a CW sine wave. It serves as the clock of the shift register 112 and also as the origin of the RF carrier that is later modulated by the PN code.

It is necessary, when the PN code is repeated every TAU, that the carrier inside the code is in exactly the same phase relationship every time. This can be achieved by deriving the carrier from the same clock signal as drives the PN generation process. The output of the VCO 114 is passed through the frequency multiplier 118 to produce an RF carrier that is then multiplied in the multiplier 120 by the PN code portion. This modulated PN code is then supplied to the filters $G_1(f)$ and $G_2(f)$ 96 and 98 as the reference signal. The unmodulated PN code continues to propagate through the shift register 126. At each stage of the shift register 126 the PN code is delayed by an amount equal to the period of the VCO 114 which also happens to be the length of one bit of the PN code. The length of the shift register could in principle be a hundred or more stages long and so the number of possible delay steps could be very large.

It should be noted that the modulated PN code is not delayed by the shift register but rather the unmodulated code is delayed. Then the modulated PN code is regenerated for a second time and at a slightly later time by multiplying the unmodulated delayed PN code taken from the shift register 126 by the same carrier that first generated the reference code. This second code is transmitted as the interrogation signal. There can be a large number of different interrogation signal delays that could be used to identify unique sensors (with unique sensor delays). The extra delays built into the interrogation path could have been added to the reference path as well. In either case the total delay in the interrogation path (the extra shift register 126 delay plus extra delays in the sensor) must equal the effective delay in the reference path in order for the time integrating correlation process to work, i.e., to address the desired sensor. The extra delay steps introduced by the shift register 126 can not be arbitrarily small otherwise the responses from different sensors could interfere with each other.

In general the range of the interrogation process (how far the sensors 88 can be located from the interrogator and still be read) defines a round trip delay TAU1. The delay of the sensor will change by an amount TAU2 when exposed to temperature or other factors to which it is made to respond. Then finally the delays must be separated by an amount TAU3 such that their responses will not interfere in the interrogator. The delay steps between usable shift register taps should be spaced by at least TAU1+TAU2+TAU3. Even with these constraints the number of possible delay ID stages could be in the tens to one hundred or more depending upon the system design details.

The system property of being able to uniquely address various sensors by introducing time delays in the sensor is called time diversity. It is also possible to use code diversity by using a set of orthogonal codes in both the signal and reference paths remembering that the requirement for generating a response from the time integrating correlator is that the signals passing through the reference path and the interrogation path must be identical. So if a code with a transfer function H(f) is inserted into both the interrogation and reference paths the time integrating correlator will recognize that sensor from all others. This can be done by implementing the code in the SAW sensor and in the SAW filters in the reference path, or the reference path filter transfer function and code may be implemented digitally.

In the event surface acoustic wave devices are used to implement filtering and code identification in the interrogator (as compared for example to digital implementation), it may very well be that the number of unique codes in the orthogonal code set will be rather small because each code requires a unique SAW device to be either mechanically or electronically inserted into the reference. This could be done for a modest number of codes, but the advantage is substantial because the total number of uniquely identifiable sensors is the product of the number of codes from code diversity times the number of time slots from time diversity. Thus, for example, if there were 40 time slots of time diversity and 6 orthogonal codes for code diversity" then the system could uniquely address 240 sensors.

There is a very general class of sensors that can be described as follows: 1) they are passive, i.e., they require no power source. 2) They are a one-port, two terminal component. 3) They have a characteristic impedance which changes in magnitude when exposed to a change in the condition to be sensed, e.g., temperature, gas, pressure, etc. It is possible to use a surface acoustic wave device as a wireless interface between these sensors and the power spectral density interrogation system provided the surface acoustic wave device has two differential taps which are combined to yield a two-tap differential filter response.

Figure 5:
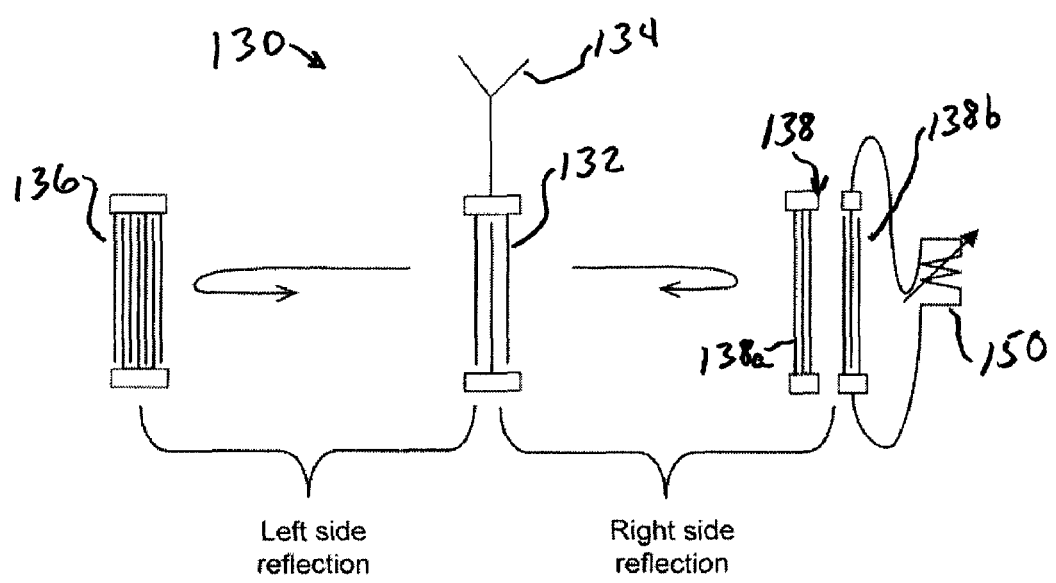
FIG. 5 is a schematic diagram showing a surface acoustic wave sensor interface with an external passive variable impedance sensing element for use with time diversity discrimination in a power spectral density sensor system according to the present invention.
Figure 6A:
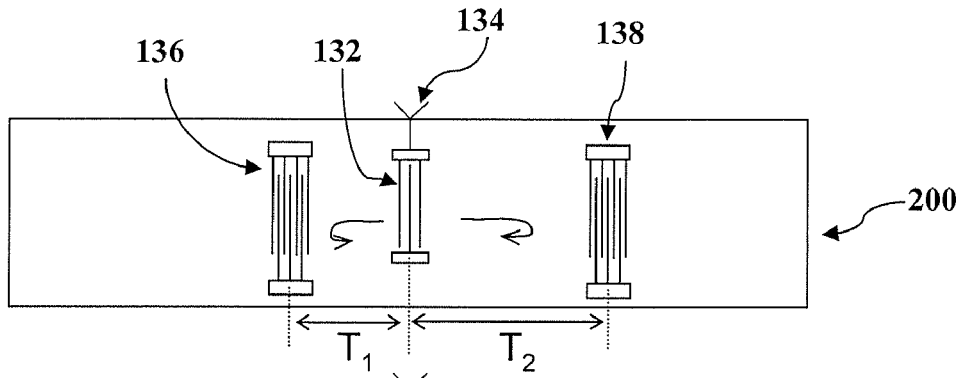
FIGS. 6a-6e are schematic illustrations showing the implantation of time diversity using different pedestal delays in the surface acoustic wave sensors according to the present invention.
Figure 6B:
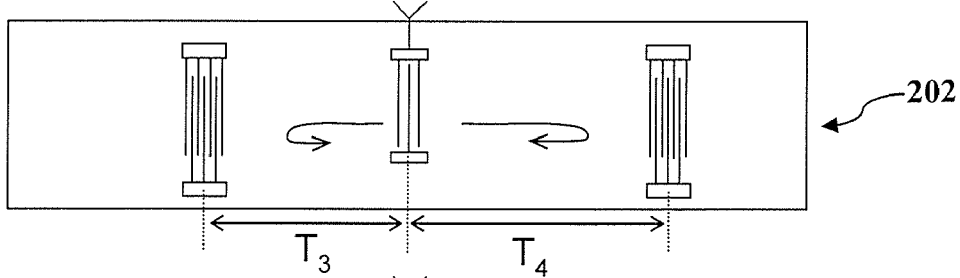
Figure 6C:
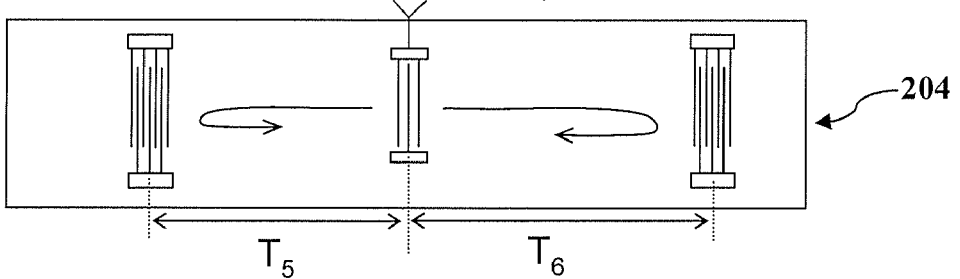
Figure 6D:
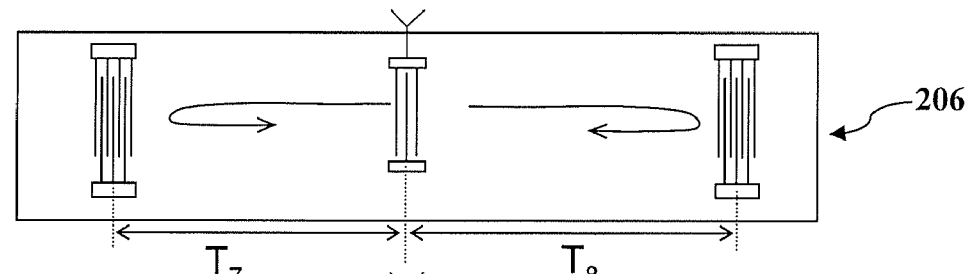
Figure 6E:
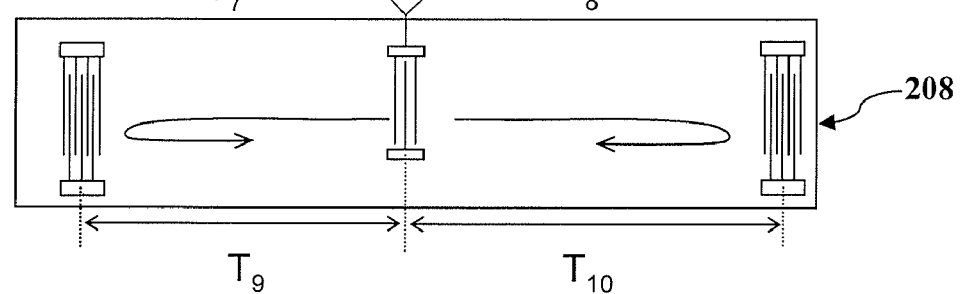

A SAW device 130 which acts as an interface between the passive, impedance element sensor and the power spectral density interrogation system described herein is shown schematically in FIG. 5. A transducer 132 is connected to an antenna 134 which communicates with the interrogator. The transducer 132 launches a surface acoustic wave (SAW) both to the left and to the right. The left propagating SAW reflects off a reflector 136 and back to the transducer 132. The time delay for this path is the product of the SAW velocity times the total path length which is the round trip distance between the centers of the transducer 132 and the reflector 136 on the left. The right propagating SAW is reflected off a combined reflector 138 consisting of the two adjacent transducers 138a and 138b on the right. In an alternate embodiment, the first transducer 138a is replaced by a group of reflecting electrodes. The point is that this first reflecting element has a fixed reflection coefficient. The second transducer 138b is connected to the variable impedance sensing element 150 and therefore its reflectivity will vary as the impedance of the sensing element 150 changes. The result is that the center of reflectivity on the right side will move as the magnitude of the reflectivity of the loaded transducer changes. The delays of the left side reflector 136 and the right side reflector 138 move very slightly with respect to each other but this is enough to make the lobes (as shown for example in FIG. 2c) move enough for the interrogator to respond. An alternative structure that is within the scope of the invention is when the reflectivity of transducer 138a goes to zero (i.e. element 138a is removed). In this case, if the sensing impedance causes the reflectively of transducer 138b to go to zero, the only reflection is from reflective element 136, and the power spectral density becomes flat. If on the other hand the sensing impendance causes the reflectivity of transducer 138b to be comparable to that of reflective element 136 then significant lobes develop, which can be measured by the interrogator. Reflectivities between these two extremes constitute the operable range of this measurement system.

FIG. 6 shows by way of example a set of five simple differential delay line sensor devices 200, 202, 204, 206 and 208 built using different pedestal delays and differential delays. Delay times are indicated in the figure by $T_n$ for different values of n. The pedestal delays for the five devices 200-208 (from top to bottom) correspond to 2·T1 2·T3; 2·T5; 2·T7; and 2·T9; while the differential delays are given by 2(T2−T1); 2(T4−T3); 2(T6−T5); 2(T8−T7); and 2(T10−T9), respectively. In FIG. 6, the pedestal delays are clearly indicated as discrete, while the differential delays can be the same for all devices or in another approach can vary by defined amounts.

While the specific embodiments shown in the figures herein utilize reflective SAW elements to implement the desired coded sensor response, it would be understood by one skilled in the art that the same function could be implemented using a combination of other SAW elements including transducers, multi-strip couplers, and the like. For example, devices such as those shown FIGS. 2a, 5, and 6 could be implemented using a central transducer to launch acoustic waves towards outer transducers or reflectors or any combination thereof, or all of the other acoustic element may be on one side of the transducer. Alternatively, two separate transducers can be electrically connected in parallel in one acoustic path to provide a similar one-port device response.

In summary, an apparatus and method for distinguishing between sensors that are to be wirelessly detected is provided. An interrogator device uses different, distinct time delays in the sensing signals when interrogating the sensors. The sensors are provided with different distinct pedestal delays. Sensors that have the same pedestal delay as the delay selected by the interrogator are detected by the interrogator whereas other sensors with different pedestal delays are not sensed. Multiple sensors with a given pedestal delay are provided with different codes so as to be distinguished from one another by the interrogator. The interrogator uses a signal that is transmitted to the sensor and returned by the sensor for combination and integration with the reference signal that has been processed by a function. The sensor may be a surface acoustic wave device having a differential impulse response with a power spectral density consisting of lobes. The power spectral density of the differential response is used to determine the value of the sensed parameter or parameters.

Thus, a method and apparatus are disclosed in which multiple distinct delays are provided in the interrogator and in the sensors to permit selective sensing of only sensors that have the same pedestal delay as the delay selected by the interrogator. Code variations between the sensors of a given pedestal delay enable sensors of that pedestal delay period to be distinguished from one another. The number of sensors that may be interrogated by an interrogator is thereby increased.

Although other modifications and changes may be suggested by those skilled in the art, it is the intention of the inventors to embody within the patent warranted hereon all changes and modifications as reasonably and properly come within the scope of their contribution to the art.

We claim:

1. A passive wireless sensor, comprising:
   (a) at least one piezoelectric substrate;
   (b) a first surface acoustic wave element including a transducer formed on a region of said at least one piezoelectric substrate for transducing a signal;
   (c) at least two additional surface acoustic wave elements formed on said at least one piezoelectric substrate;
   (d) a pair of acoustic wave propagation paths, wherein:
      (i) the acoustic wave propagation paths each respond differently to variations in an external parameter to be sensed; and
      (ii) responses from the pair of acoustic wave propagation paths are combined to produce a signal with a power spectral density such that integrated power within each of two portions of the spectrum provide an indicator of the sensed parameter.

2. A passive wireless sensor as in claim 1, wherein said pair of acoustic wave propagation paths respond differently to variations in an external parameter to be sensed due to differences in a change in acoustic wave velocity induced in at least one of said acoustic wave propagation paths by variations in the external parameter.

3. A passive wireless sensor as in claim 1, wherein said pair of acoustic wave propagation paths respond differently to variations in an external parameter to be sensed due to differences in the impedance loading induced in at least one of said paths by variations in the external parameter.

4. A passive wireless sensor as in claim 1, wherein said surface acoustic wave elements include coding for use in discriminating between sensors.

5. A group of passive wireless sensors, each of said sensors comprising:
   (a) at least one piezoelectric substrate;
   (b) a first surface acoustic wave element including a transducer formed on a region of said at least one piezoelectric substrate for transducing a signal;
   (c) at least two additional surface acoustic wave elements formed on said at least one piezoelectric substrate;
   (d) a pair of acoustic wave propagation paths, wherein:
      (i) the acoustic wave propagation paths each respond differently to variations in an external parameter to be sensed;
      (ii) responses from the pair of acoustic wave propagation paths are combined to produce a signal with a power spectral density such that integrated power within each of two portions of the power spectrum provide an indicator of the sensed parameter; and
      (iii) said pair of acoustic wave propagation paths produce responses with a predetermined pedestal delay and a differential delay between them; and
   (e) wherein the predetermined pedestal delay of each said sensor is selected from a quantized set of delays which is used for discrimination between sensors.

6. A group of passive wireless sensors as in claim 5, wherein said two acoustic wave propagation paths respond differently to variations in an external parameter to be sensed due to differences in a change in acoustic wave velocity induced in at least one of said acoustic wave propagation paths by variations in the external parameter.

7. A group of passive wireless sensors as in claim 5, wherein said two acoustic wave propagation paths respond differently to variations in an external parameter to be sensed due to differences in impedance loading induced in at least one of said acoustic wave propagation paths by variations in the external parameter.

8. A group of passive wireless sensors as in claim 5, wherein said surface acoustic wave elements include coding for use in discriminating between the sensors.

9. A wireless multi-sensor system, comprising:
   (a) at least two passive sensors, each sensor including:
      (i) at least one piezoelectric substrate;
      (ii) a first surface acoustic wave element including a transducer formed on a region of said at least one piezoelectric substrate for transducing a signal;
      (iii) at least two additional surface acoustic wave elements formed on said at least one piezoelectric substrate;
      (iv) a pair of acoustic wave propagation paths, wherein:
         (a) the acoustic wave propagation paths each respond differently to variations in an external parameter to be sensed;
         (b) responses from the pair of acoustic wave propagation tracks are combined to produce a signal with a power spectral density such that an integrated power within each of two predetermined portions of the power spectrum provide an indicator of the sensed parameter; and
         (c) said pair of acoustic wave propagation paths produce responses with a predetermined pedestal delay and a differential delay between them; and
      (v) wherein the predetermined pedestal delay of each said sensor is selected from a quantized set of delays for use in discriminating between sensors; and
   (b) an interrogator which transmits an interrogating signal to said at least two passive sensors and receives the response signals from said at least two passive sensors, said interrogator including
      (i) a voltage source for providing the interrogating signal;
      (ii) a communicating device for transmitting the interrogating signal to said at least two passive sensors and for receiving the response signals therefrom; and
      (iii) a signal processor for adjusting a reference or interrogator signal path delay needed to synchronize a reference signal with the sensor response signals to identify and selectively evaluate the response of a subset of sensors with a predetermined pedestal delay within a combined sensor signal; and
      (iv) a signal processor for calculating an integrated power within each of said two portions of the frequency spectrum to produce a metric corresponding to the sensed parameter.

10. A wireless multi-sensor system as in claim 9, wherein said two acoustic wave propagation paths respond differently to variations in an external parameter to be sensed due to differences in the change in the acoustic wave velocity induced in at least one of said paths by variations in the external parameter.

11. A wireless multi-sensor system as in claim 9, wherein said two acoustic wave propagation paths respond differently to variations in an external parameter to be sensed due to differences in the impedance loading induced in at least one of said paths by variations in the external parameter.

12. A wireless multi-sensor system, comprising:
(a) at least two passive sensors, each sensor including;
  (i) at least one piezoelectric substrate;
  (ii) a first surface acoustic wave element including a transducer formed on a region of said at least one piezoelectric substrate for transducing a signal;
  (iii) at least two additional surface acoustic wave elements formed on said at least one piezoelectric substrate;
  (iv) at least one pair of acoustic wave propagation paths, wherein:
    (a) said propagation paths respond differently to variations in at least one external parameter to be sensed;
    (b) said at least one pair of acoustic wave propagation paths produce responses with a specified pedestal delay and a differential delay between them; and
  (v) wherein the specified pedestal delay of each said sensor is selected from a quantized set of delays to provide a means of discrimination between sensors; and
(b) an interrogator which transmits an interrogating signal to said at least one passive sensor and receives the response signal from said at least one passive sensor, said interrogator including
  (i) a voltage source for providing the interrogating signal;
  (ii) a communicating device for transmitting the interrogating signal to said at least one passive sensor and for receiving the response signal therefrom; and
  (iii) a signal processor for adjusting the reference or interrogator signal path delay needed to synchronize the reference signal with the sensor signal to identify and selectively evaluate the response of a subset of sensors with a specific pedestal delay within the combined sensor signal; and
  (iv) a signal processor for calculating a metric corresponding to the sensed parameter.

13. A wireless multi-sensor system as in claim 12, wherein said at least one pair of acoustic wave propagation paths respond differently to variations in at least two external parameters to be sensed due to differences in the change in the acoustic wave velocity induced in each of said paths by variations in the external parameters and due to differences in the impedance loading induced in at least one of said paths by variations in the external parameters.

14. A group of passive wireless sensors, each of said sensors comprising
(a) at least one piezoelectric substrate;
(b) a first SAW element comprising a transducer formed on a region of said piezoelectric substrate for transducing a signal;
(c) at least two additional SAW elements formed on said piezoelectric substrate;
(d) a pair of acoustic wave propagation paths that are defined by the position of said SAW elements relative to the crystal axes of the substrate, wherein:
  (i) the paths each respond differently to variations in an external parameter to be sensed; and
  (ii) said pair of acoustic wave propagation paths produce responses with a specified pedestal delay and a differential delay between them; and
(e) wherein the specified pedestal delay of each said sensor is selected from a quantized set of delays to provide a means of discrimination between sensors.

* * * * *